(12) United States Patent
Szafraniec

(10) Patent No.: US 7,162,165 B2
(45) Date of Patent: Jan. 9, 2007

(54) KALMAN FILTER ASSEMBLY INTENSITY NOISE SUBTRACTION FOR OPTICAL HETERODYNE RECEIVERS

(75) Inventor: Bogdan Szafraniec, Sunnyvale, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 958 days.

(21) Appl. No.: 10/212,495

(22) Filed: Aug. 2, 2002

(65) Prior Publication Data

US 2004/0022547 A1 Feb. 5, 2004

(51) Int. Cl.
*H04B 10/06* (2006.01)
(52) U.S. Cl. ........................ 398/202; 398/204
(58) Field of Classification Search ............... 398/202, 398/204–206, 207, 212, 85
See application file for complete search history.

(56) References Cited

U.S. PATENT DOCUMENTS

| 4,868,896 A | 9/1989 | Pietzsch | |
|---|---|---|---|
| 2004/0208436 A1* | 10/2004 | Hamimi et al. | ............... 385/27 |

FOREIGN PATENT DOCUMENTS

| EP | 0 251 062 A2 | 6/1987 |
|---|---|---|
| EP | 1 168 681 A2 | 1/2002 |
| EP | 1 241 807 A2 | 9/2002 |

* cited by examiner

*Primary Examiner*—David C. Payne

(57) ABSTRACT

A Kalman filter is used to estimate the coefficients of an FIR filter to optimize the noise subtraction in a balanced optical heterodyne receiver and related receiver configurations. The Kalman filter is used both statically and dynamically.

29 Claims, 11 Drawing Sheets

KALMAN FILTER ASSEMBLY INTENSITY NOISE SUBTRACTION FOR OPTICAL HETERODYNE RECEIVERS

FIELD OF THE INVENTION

The present invention is generally directed to the reduction of optical intensity noise in optical heterodyne receivers with application to receivers in optical heterodyne spectrum analyzers.

BACKGROUND OF THE INVENTION

The signal to noise ratio in optical heterodyne receivers may be improved by using balanced receivers that allow subtraction of the intensity noise while doubling the heterodyne signal. Intensity noise, as described in this application, includes both the traditional intensity noise resulting from the beating between the spectral component of the local oscillator (LO) or the measured signal, and the purposely induced intensity modulation of the optical signal as means for the transmission of information. In the receiver of the heterodyne optical spectrum analyzer the measured quantity is the optical spectrum contained within the heterodyne beat signal. Therefore, the heterodyne beat signal has to be distinguished from the intensity noise, which may appear in the same frequency range.

FIG. 1 shows balanced receiver 101 having two photodiodes 105 and 110 which are used at the outputs of coupler/combiner 115. The intensity noise of the laser under test (not shown) is split and appears at both photodiodes 105 and 110 with the same phase. The intensity noise can be a characteristic of the laser under test (random modulation resulting from the beating of the spectral components) or the result of intensity modulation (induced modulation that achieves the transmission of information). Similarly, the intensity noise (random modulation) of the local oscillator is split and appears at both photodiodes 105 and 110 with the same phase. The heterodyne signal resulting from the mixing of the laser under test and the local oscillator (not shown) at the frequency difference $\omega_o - \omega_s$. Because of the phase shift experienced by the cross-coupled waves in coupler/combiner 115 the heterodyne signals incident on detectors 105 and 110 are out of phase. Information about the spectrum is contained in the heterodyne signal so it is advantageous to suppress the intensity noise terms. This may be accomplished by subtracting the signal received by photodiode 105 from the signal received by photodiode 110.

Ideally, subtraction cancels the intensity noise terms while doubling the heterodyne signal which has opposite phase at photodiodes 105 and 110. In practice however, complete cancellation of noise does not take place because the splitting ratio of coupler/combiner 115 is not fifty-fifty, the responses of photodiodes 105 and 110 are not identical along with other aspects related to the two signal paths. Furthermore, the electrical signals from photodiodes 105 and 110 are amplified by preamps 130 and 135 whose amplitude and phase response is not identical. Therefore, it is desirable to condition the electrical signals from preamps 130 and 135 to compensate for the path differences and enhance the effect of the intensity noise subtraction. Additionally, it is desirable to compensate for any drift in the system due to wavelength, polarization state and other changes.

SUMMARY OF THE INVENTION

A recursive Kalman filter offers calibration methods and dynamic adjustments that are adaptive in their nature. The Kalman filter may be used to calibrate the intensity noise subtraction in an optical heterodyne balanced receiver system based on the direct sampling of the intensity noise. The intensity noise and the heterodyne signal typically overlap in frequency which makes it desirable to remove the intensity noise in order to measure the heterodyne signal accurately.

In accordance with the invention, dynamic compensation for changes in the measurement system such as the operating wavelength, polarization state or drift of the electronics is achieved. Intensity noise subtraction is dynamically adjusted when characteristics of the optical signal change in time or vary from optical signal to optical signal such as within a single sweep of an optical heterodyne spectral analyzer as may occur when multiple DWDM channels have different polarization states and different optical frequencies.

DETAILED DESCRIPTION OF THE INVENTION

Figure 1:
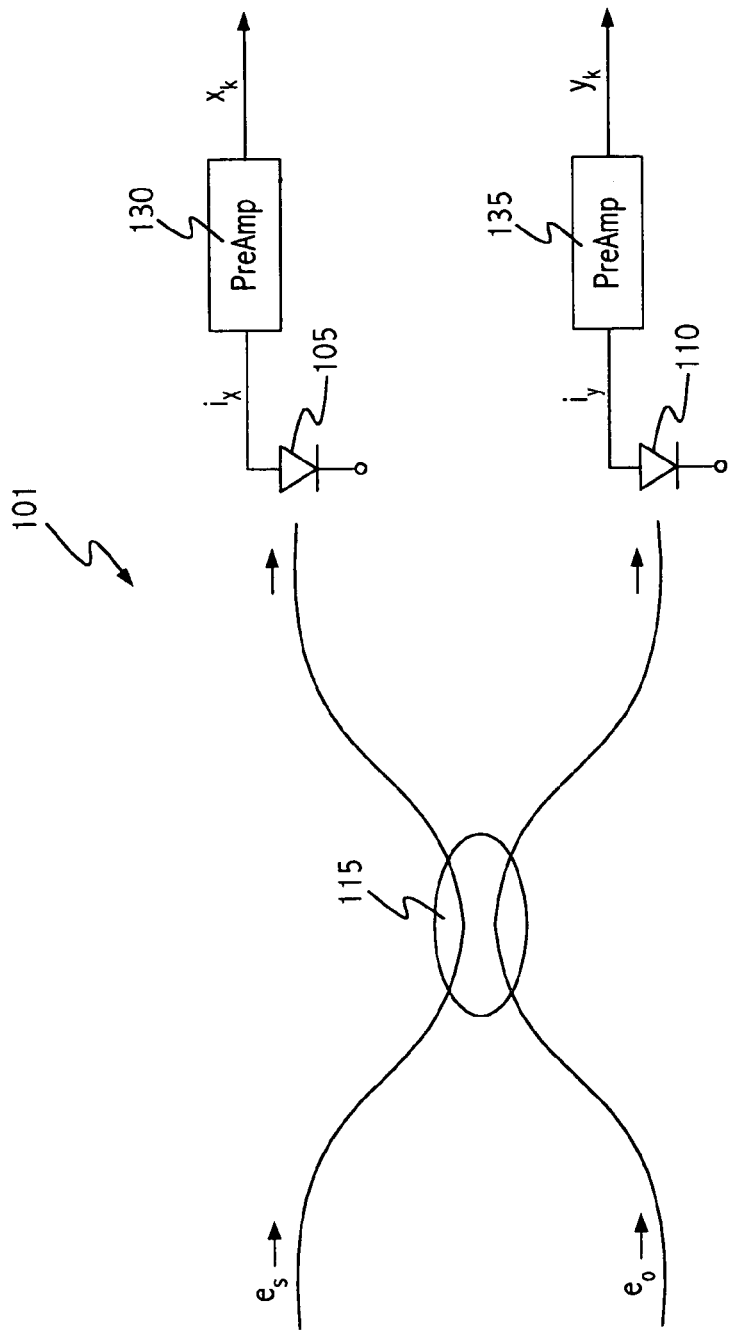
FIG. 1 shows a prior art balanced receiver.
Figure 2:
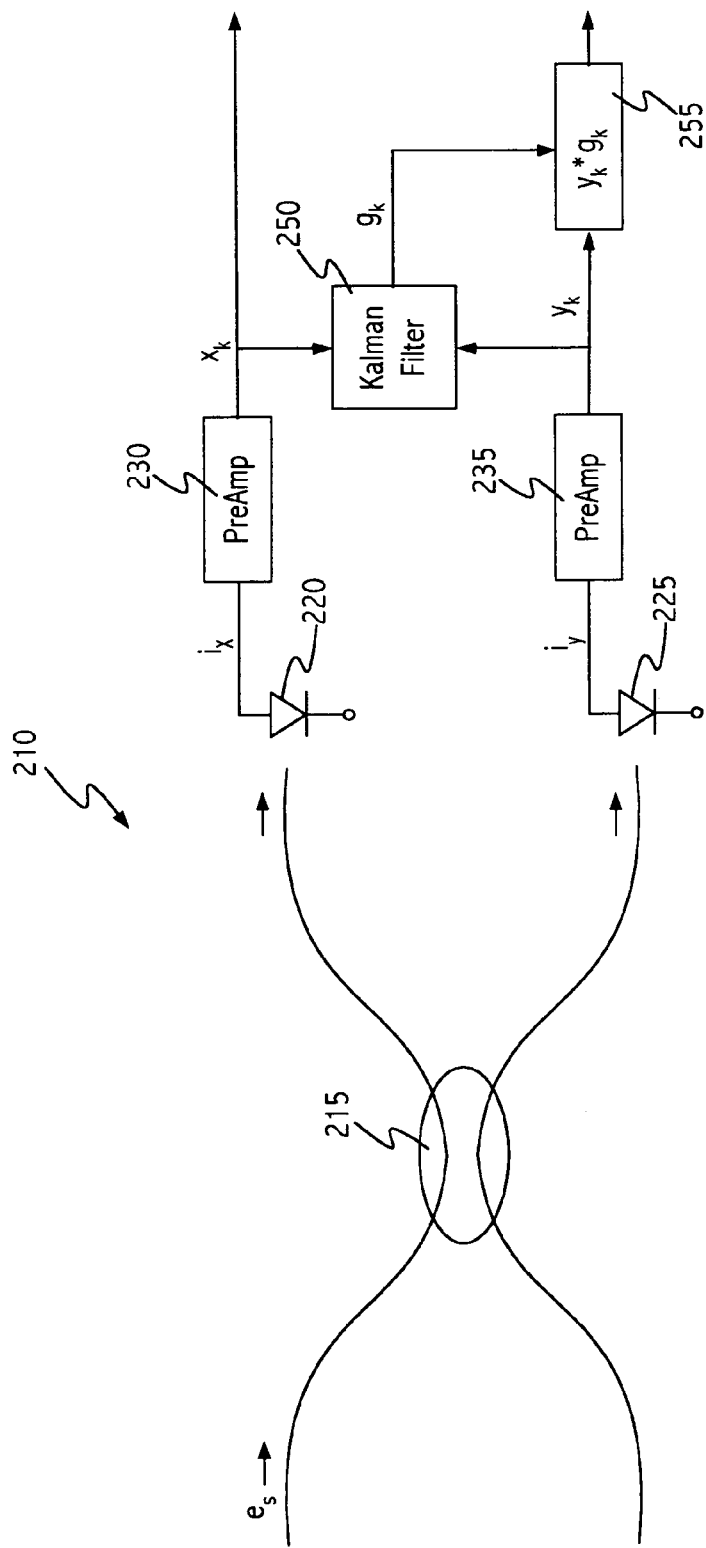
FIG. 2 shows an embodiment of a balanced receiver in accordance with the invention.

FIG. 2 shows an embodiment of balanced receiver 210 in accordance with the invention. Balanced receiver 210 needs to be calibrated for imbalances due to the splitting ratio of coupler combiner 215, the different responsivities of photodiodes 220 and 225 and preamplifiers 230 and 235 to optimize noise subtraction. Optical input $e_s$ originating from the laser under test (not shown) contains intensity noise and is distributed via coupler combiner 215 to photodiodes 220 and 225 where the intensity noise is converted to an electrical output before passing through preamplifier 230 and preamplifier 235, respectively. The intensity noise $i_s$ is amplified and appears on both channels of the balanced receiver. To optimize the subtraction for canceling the intensity noise, intensity noise contained in electrical output x(t) and y(t) in the respective channels need to be made equal. To make y(t) substantially equal to x(t), the sampled intensity noise $y_k$ is filtered by FIR filter 255 having filter coefficients $g_k$. FIR filter 255 may be realized using Kalman filter 250 to estimate coefficients $g_k$. Kalman filter 250 and FIR filter 255 may be implemented in hardware or software. For example, if Kalman filter 250 is implemented in software, Kalman filter 250 comprises computer-readable instructions stored in memory or other computer readable medium. A processor is typically used to implement recursive Kalman filter 250 as described below.

Mathematically, $$x_k \approx [y_{k-n} \ldots y_{k-1}\ y_k\ y_{k+1} \ldots y_{k+m}] \begin{bmatrix} g_{-n}^{(k)} \\ \vdots \\ g_0^{(k)} \\ \vdots \\ g_n^{(k)} \end{bmatrix} = Y_k \cdot G_k \quad (1)$$

where k denotes the k-th sample or the k-th estimate of the vector G containing the coefficients of FIR filter 255 that are to be estimated. The elements of the vector G are constant from one estimate to the next except for the noise contributions. By adding noise terms $w_k$ and $v_k$ which represent process and measurement noise, respectively, a set of Eqs. (2) and (3) is obtained that is consistent with the process equations required by the Kalman filter:

$$G_k = G_{k-1} + w_k \quad (2)$$

$$x_k = Y_k \cdot G_k + v_k \quad (3)$$

The Kalman filter is a set of mathematical equations that provides an efficient computational (recursive) least-squares solution for the state variables $g_1^{(k)}$ contained in the vector $G_k$. In Eqs. (2) and (3) the vector $Y_k$ is not constant but is made up of sliding data points $y_k$. This type of formulation of the process equations is known in control systems as system identification. The Kalman solution for the set of Eqs. (2) and (3) is found in the same manner as for the process equations having a constant vector Y. The length of the vector G can be varied from 1 to 2n+1 where higher values of n provide better corrections at the cost of more computational overhead.

Figure 3:
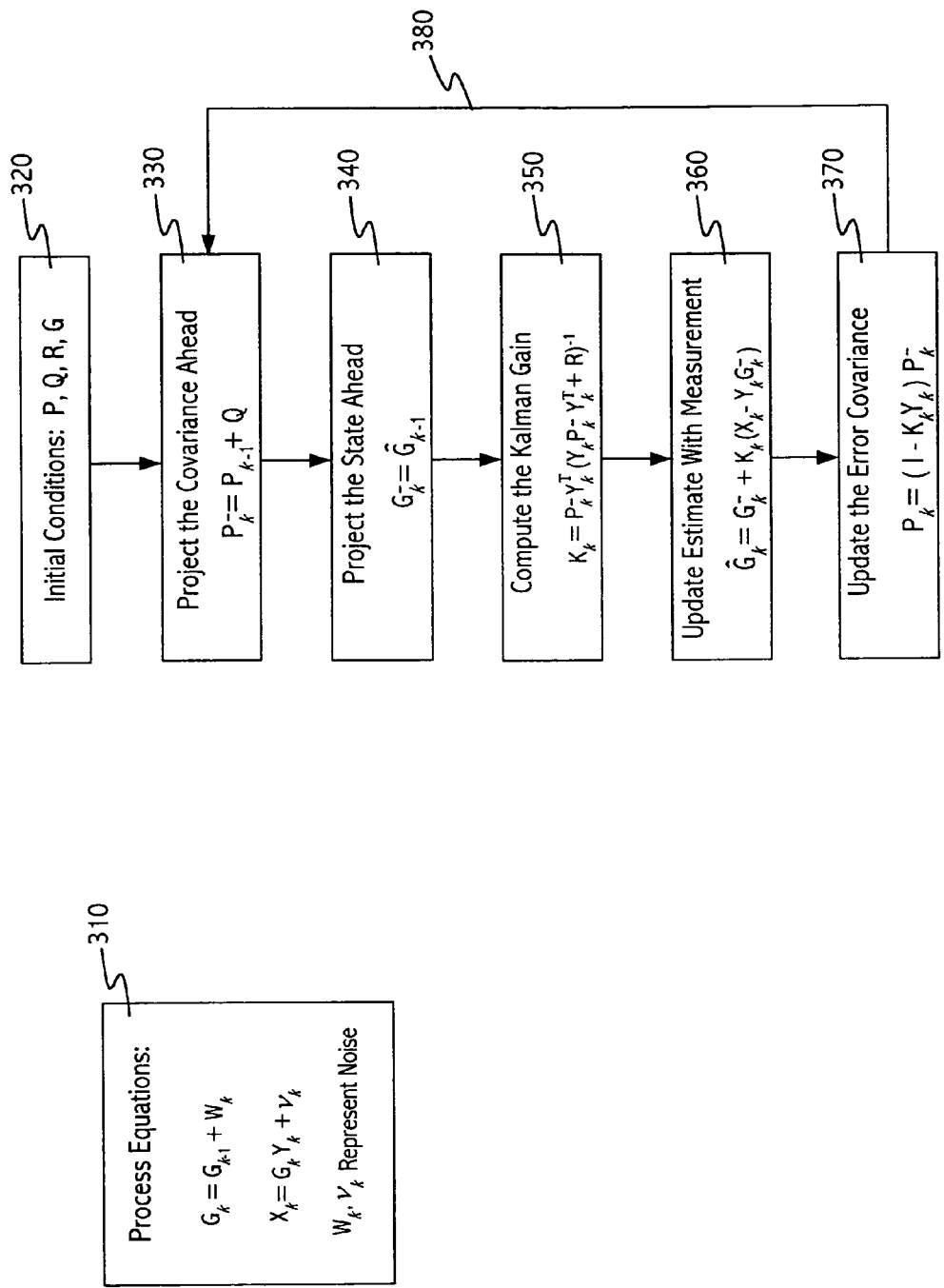
FIG. 3 shows the steps in the Kalman filter for estimating the coefficients of the FIR filter in accordance with the invention

FIG. 3a shows the implementation of Kalman filter 250 for the process equations in block 310 which are the same as Eqs. (2) and (3) above. Step 320 defines the covariance matrices Q and R that describe the process noise and the measurement noise, respectively, provides the initial conditions for the matrix P, and the initial guess for the sought vector G. These initial conditions are used to determine $P_k^-$ and $G_k^-$ for time step k=1. Step 330 updates the value of $P_k^-$ based on the value of $P_{k-1}$ and the process noise covariance Q. Note that $P_k^-$ is the a priori estimate error covariance and $P_k$ is the a posteriori estimate error covariance. Step 340 projects the state $\hat{G}_{k-1}$ ahead to the next time step $G_k^-$. In step 350 the Kalman gain $K_k$, at the kth time step is computed:

$$K_k = P_k^- Y_k^T (Y_k P_k^- Y_k^T + R)^{-1} \quad (4)$$

where $Y_k$ is the sampled intensity noise vector at the kth time step (see Eq. (1)) and R is the measurement covariance. Step 360 updates the estimate for FIR filter 255 mathematically represented by the vector G with a measurement according to:

$$\hat{G}_k = G_k^- + K_k (x_k - Y_k G_k^-) \quad (5)$$

where $(x_k - Y_k G_k^-)$ is the residual and reflects the discrepancy between the prediction $Y_k G_k^-$ and the actual intensity noise measurement $x_k$. Finally, step 370 updates the covariance error according to:

$$P_k = (I - K_k Y_k) P_k^- \quad (6)$$

Step 380 increments the time step k and the updated quantities are input to repeat the time and measurement updates starting with step 330.

Figure 4:
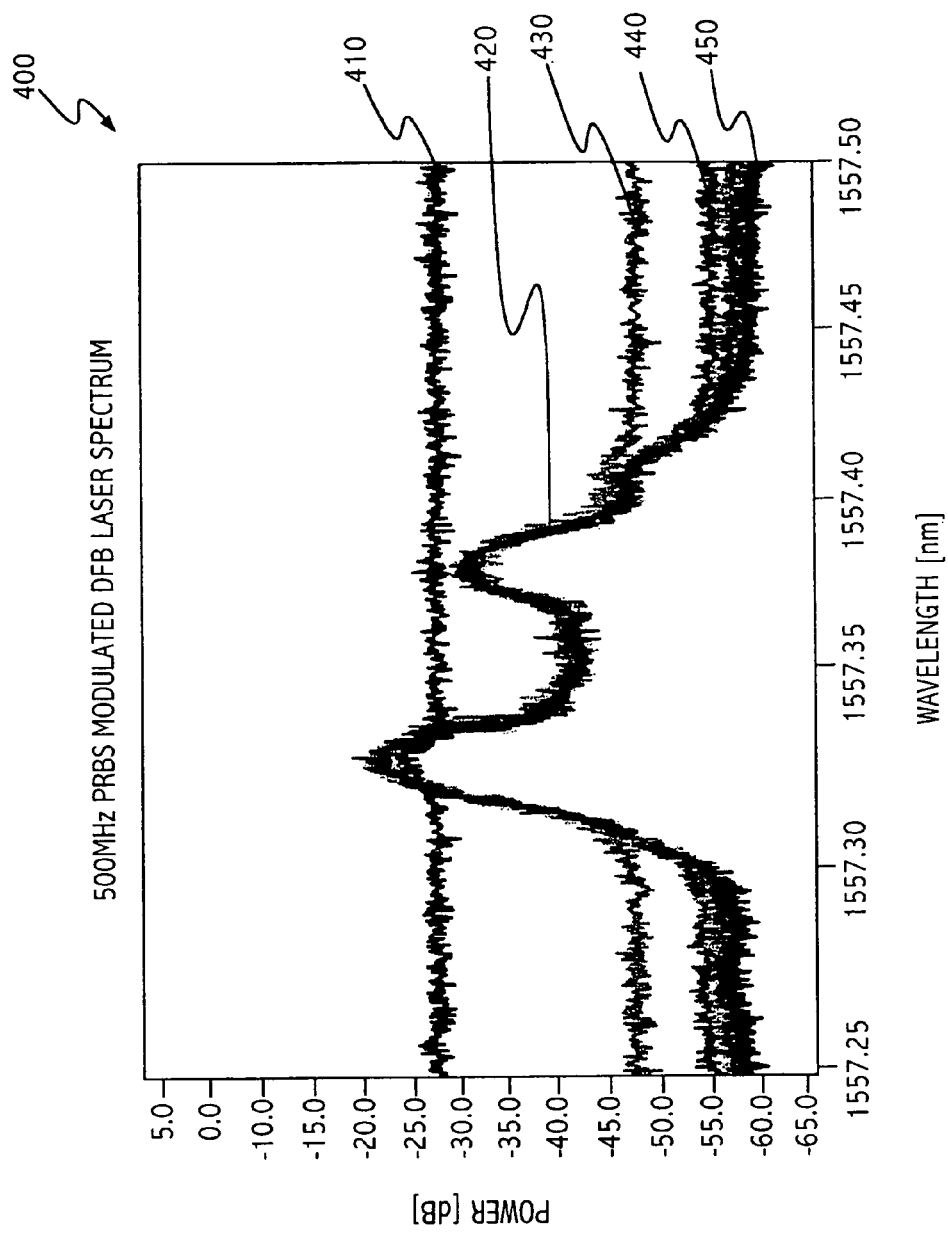
FIG. 4 shows the improvements in a 500 MHz PRBS modulated DFB laser spectrum using an embodiment in accordance with the invention.

In FIG. 4, graph 400 plots the power in dB versus wavelength in nanometers for an exemplary 500 MHz pseudo-random binary sequence (PBRS) modulated DFB laser spectrum. Plot 410 shows that the spectrum is not visible without any noise subtraction, i.e. for G=0. Plot 420 shows the effect of noise subtraction using a 1 coefficient FIR filter on the measured spectrum. Plot 430 shows the effect of noise subtraction with a 2 coefficient FIR filter on the measured spectrum. Plot 440 shows the effect of noise subtraction with a 4 coefficient FIR filter on the measured spectrum while plot 450 shows the effect of noise subtraction with a 16 coefficient FIR on the measured spectrum. The 16 coefficient FIR filter provides sufficient noise subtraction to reach the noise floor of the system in this example.

Figure 5:
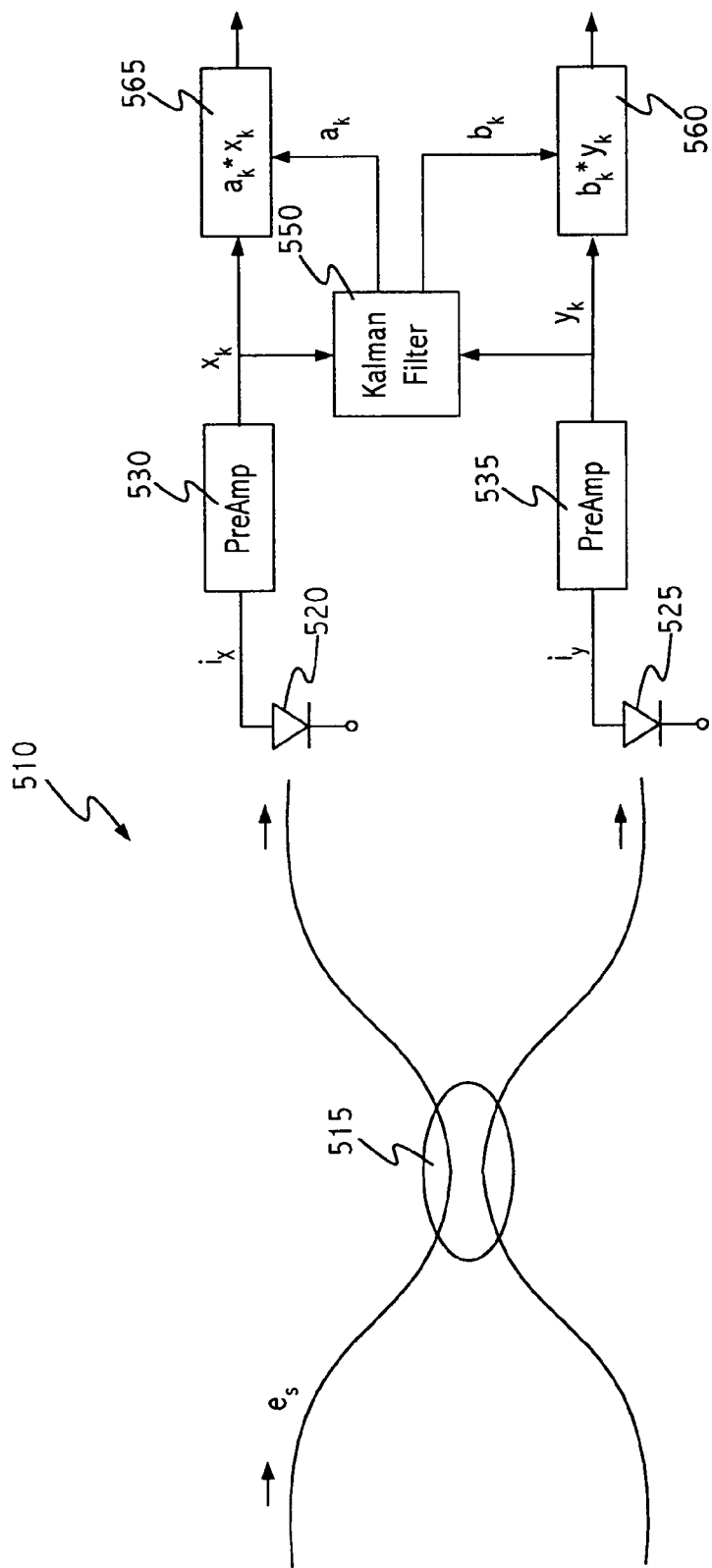
FIG. 5 shows an embodiment of a balanced receiver in accordance with the invention.

An embodiment in accordance with the invention involving the correction of both output channels containing x(t) and y(t) is shown in FIG. 5. Balanced receiver 510 must be calibrated for imbalances due to the splitting ratio of coupler/combiner 515, the different responsivities of photodiodes 520 and 525 and preamplifiers 530 and 535 to optimize intensity noise subtraction. Optical input $e_s$ contains intensity noise that originates from the laser under test (not shown) and is distributed via coupler combiner 515 to photodiodes 520 and 525 and is converted to an electrical output before passing through preamplifier 530 and preamplifier 535, respectively. To optimize the intensity noise subtraction for canceling the intensity noise, intensity noise contained in electrical outputs x(t) and y(t) needs to be made equal. The intensity noise y(t) may be made equal to x(t) by correcting both output channels using the filter coefficients $a_k$ and $b_k$ for FIR filters 565 and 560, respectively, in a balanced configuration. Electrical output $x_k$ is filtered by FIR filter 565 and electrical output $y_k$ is filtered by FIR filter 560 so that intensity noise contained in electrical outputs x(t) and y(t) is substantially equal. The appropriate vector $G_k$ with filter coefficients $a_k$ and $b_k$ may be realized using Kalman filter 550. Kalman filter 550, FIR filters 560 and 565 may be implemented in hardware or software. For example, if Kalman filter 550 is implemented in software, Kalman filter 550 comprises computer-readable instructions stored in memory or other computer readable medium and a processor is typically used to implement recursive Kalman filter 550 as described below.

Mathematically, $$y_k = b_1 y_{k-1} + b_2 y_{k-2} + \ldots + b_n y_{k-n} + a_0 x_{k-1} + \ldots + a_n x_{k-n} + v_k \quad (7)$$

for an autoregressive moving average (ARMA) model where $v_k$ is a noise term, $a_k$ and $b_k$ are FIR filter coefficients, and $x_k$ and $y_k$ are the outputs of preamplifier 530 and preamplifier 535, respectively. Recasting Eq. (7) for application to the noise subtraction problem:

$$y_k \approx a_0 x_k + a_1 x_{k-1} + \ldots + a_n x_{k-n} + b_1 y_{k-1} + b_2 y_{k-2} + \ldots + b_n y_{k-n} \quad (8)$$

or in vector notation:

$$y_k = H_k \cdot G_k \quad (9)$$

where $$H_k = [y_{k-1}, y_{k-2}, \ldots, y_{k-n}, x_k, x_{k-1}, \ldots x_{k-n}] \quad (10)$$

and $$G_k = [b_1^{(k)}, b_2^{(k)}, \ldots b_n^{(k)}, \ldots a_0^{(k)}, a_1^{(k)}, \ldots a_n^{(k)}] \quad (11)$$

and (k) is the kth estimate. FIR filter 565 implements a convolution $a_0 x_k + a_1 x_{k-1} + \ldots + a_n x_{k-n}$ while FIR filter 560 implements a convolution $y_k - b_1 y_{k-1} - b_2 y_{k-2} - \ldots - b_n y_{k-n}$. The process equations and Kalman filter nearly the same manner as above. Vector $H_k$ contains both x and y samples in the balanced configuration in contrast to vector $Y_k$ above which contains only y samples.

Figure 6:
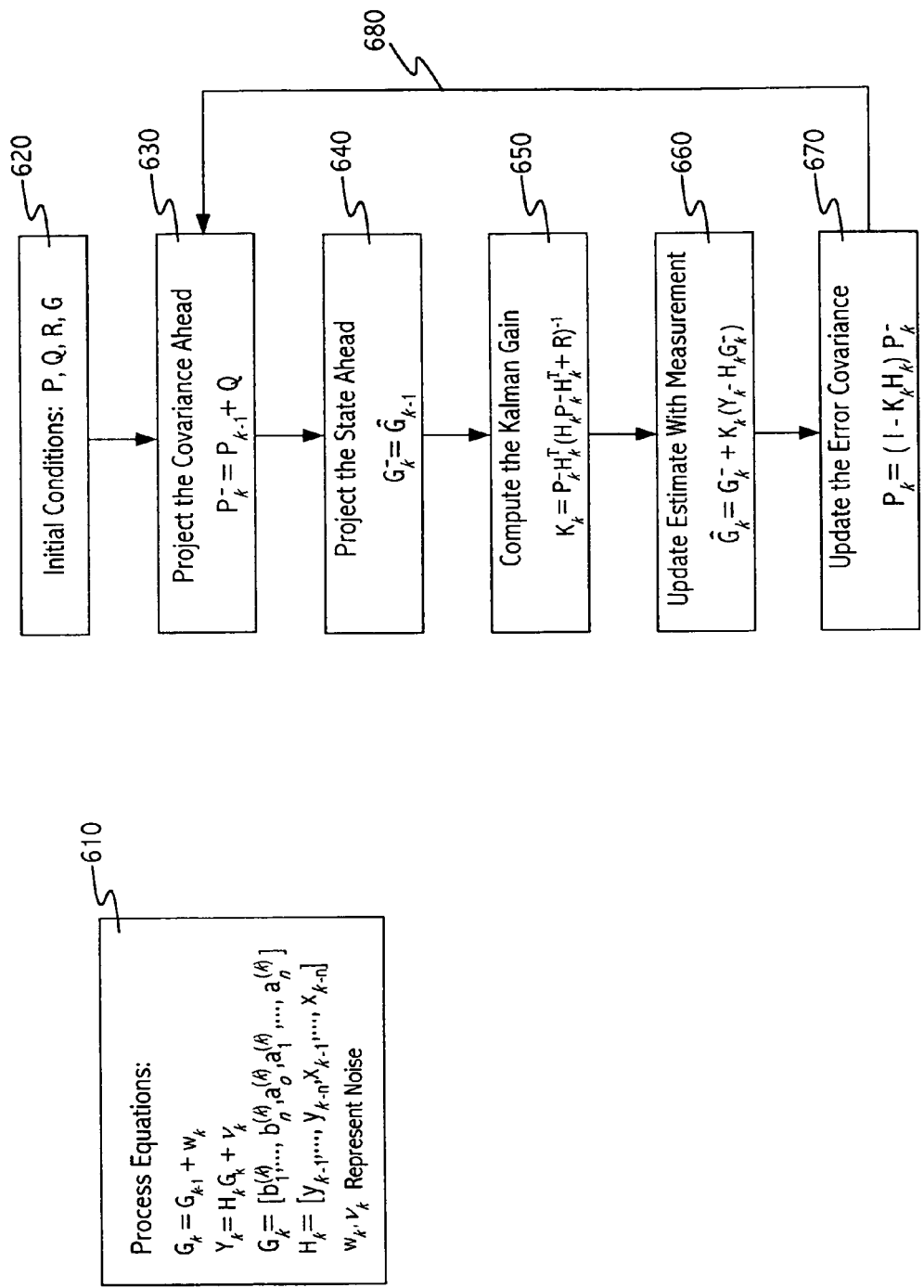
FIG. 6 shows the steps in the Kalman filter for estimating the coefficients of the FIR filter in accordance with the invention

FIG. 6 shows the implementation of Kalman filter 550 for the process equations in block 610:

$$G_k = G_{k-1} + w_k \quad (12)$$

$$y_k = H_k G_k + v_k \quad (13)$$

where $w_k$ and $v_k$ are noise terms which represent process and measurement noise, respectively. Step 620 defines the covariance matrices Q and R that describe the process noise and the measurement noise, respectively, provides the initial conditions for the matrix P, and the initial guess for the sought vector G. These initial conditions are used to determine $P_k^-$ and $G_k^-$ or time step k=1. Step 630 updates the value of $P_k^-$ based on the value of $P_{k-1}$ and the process noise covariance Q. Note that $P_k^-$ is the a priori estimate error covariance and $P_k$ is the a posteriori estimate error covariance. Step 640 projects the state $\hat{G}_{k-1}$ ahead to the next time step $G_k^-$. In step 650, the Kalman gain $K_k$, at the kth time step is computed:

$$K_k = P_k^- H_k^T (H_k P_k^- H_k^T + R)^{-1} \quad (14)$$

where $H_k$ contains the sampled intensity noise vectors $x_k$ and $y_k$ at the kth time step (see Eq. (10)) and R is the measurement covariance. Step 660 updates the estimate for the FIR filter G with a measurement according to:

$$\hat{G}_k = G_k^- + K_k (y_k - H_k G_k^-) \quad (15)$$

where $(y_k - H_k G_k^-)$ is the residual and reflects the discrepancy between the prediction $H_k G_k^-$ and the actual measurement $y_k$. Finally, step 670 updates the covariance error according to:

$$P_k = (I - K_k H_k) P_k^- \quad (16)$$

Step 680 increments the time step k and the updated quantities are input to repeat the time and measurement updates starting with step 630.

Typically, when using a balanced receiver with, for example, a heterodyne optical spectrum analyzer it is desirable to be able to dynamically subtract the intensity noise in the presence of both the local oscillator signal and the laser signal to be characterized. Dynamic subtraction implies that the correction made to either x or y may vary in time and reflects the change due to the polarization state, wavelength or simply due to a time drift of the electrical receiver characteristics. In the presence of both the local oscillator signal and the laser signal, $x_k \approx n_k + s_k$ and $y_k \approx n_k - s_k$ where $n_k$ is the in-phase intensity noise term and $s_k$ is the oup-of-phase heterodyne signal term. Dynamic subtraction may be accomplished by having a Kalman filter that dynamically estimates the appropriate FIR filter coefficients for wavelength and polarization changes. The estimation of more than one coefficient allows changes not just for amplitude but also for electrical frequency dependent amplitude and/or phase at the price of increased computational complexity. If a balanced receiver system is dominated by intensity noise then $x_k \approx y_k$ and if the heterodyne beat signal dominates then $x_k \approx -y_k$.

Figure 7:
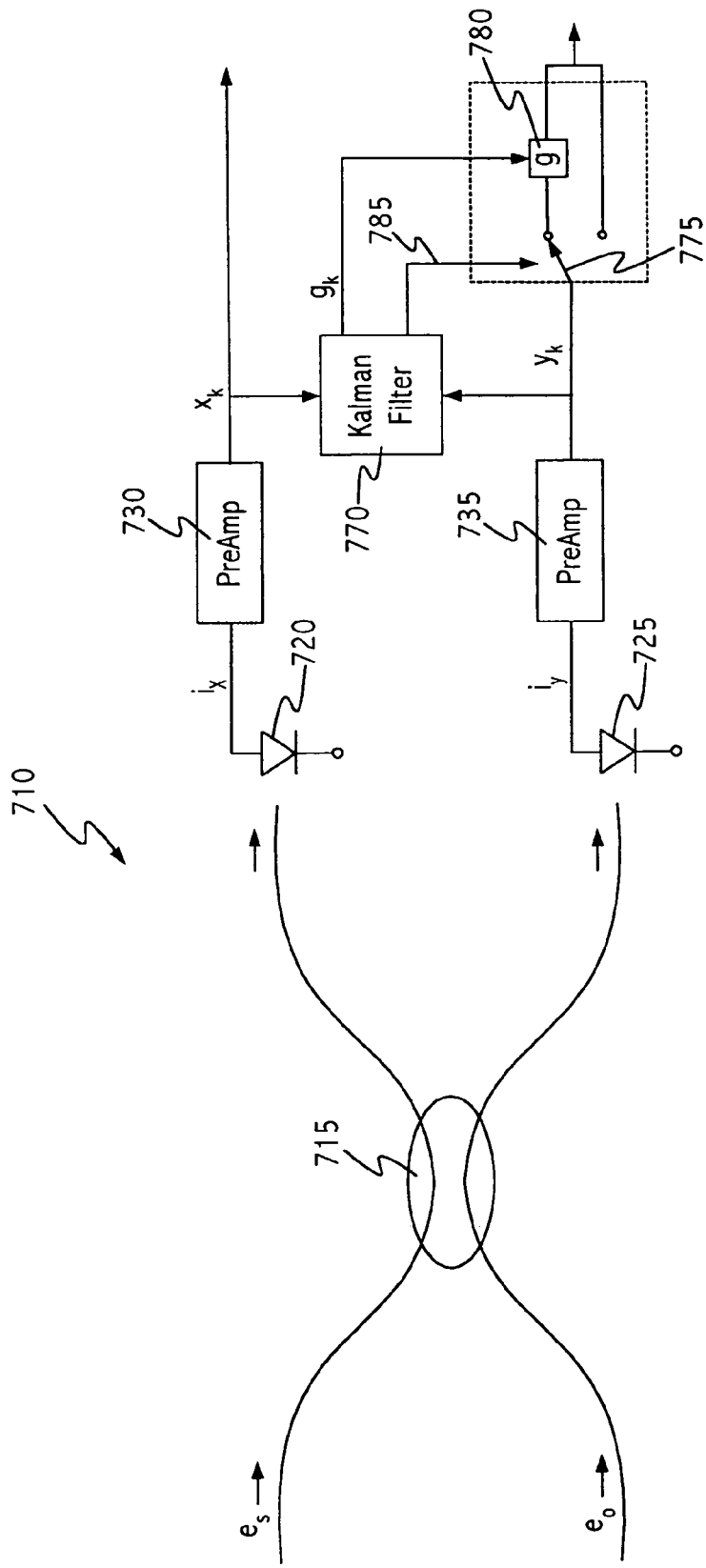
FIG. 7 shows an embodiment of a balanced receiver in accordance with the invention.

FIG. 7 shows an embodiment of balanced receiver system 710 in accordance with the invention where dynamic Kalman filter 770 is used to estimate a single coefficient for FIR filter 770 in a single channel configuration. FIR filter 770 allows for adjustment of amplitude when characteristics of the optical signal change in time. Local oscillator optical input $e_o$ and laser optical input $e_s$, enter coupler/combiner 715. The heterodyne beat signal and intensity noise are received by photodiodes 720 and 725 and converted to electrical outputs. Preamps 730 and 735 amplify the electrical output from photodiodes 720 and 725. The electrical outputs from preamplifiers 730 and 735, $x_k$ and $y_k$, respectively, are sampled by dynamic Kalman filter 770 which estimates a single coefficient to improve the intensity noise subtraction. Kalman filter 770 and FIR filter 780 may be implemented in hardware or software. For example, if Kalman filter 770 is implemented in software, Kalman filter 770 comprises computer-readable instructions stored in memory or other computer readable medium and typically a processor to implement the recursive Kalman filter as described below. The process equations required by single coefficient Kalman filter 770 are Eqs. (1) and (2) above.

If balanced receiver system 710 is dominated by intensity noise, $x_k \approx y_k$ with $g_k \approx 1$ indicating high correlation. If the balanced receiver system 710 is dominated by the heterodyne beat signal, $x_k \approx -y_k$ with $g_k \approx -1$ indicating high anti-correlation. Hence, dynamic Kalman filter 770 continuously calculates FIR filter coefficient $g_o^{(k)}$ where k refers to the kth estimate and differentiates between spectral regions dominated by noise and spectral regions dominated by the heterodyne signal. FIR filter 780 is only applied when the channels are intensity noise dominated. Noise flag 785 serves to set switch 775 to pass $y_k$ through FIR filter 780 when $$g_o^{(k)}$$

is typically greater than about 0.8, for example. Otherwise $y_k$ is not modified. In regions where the heterodyne beat signal is dominated by noise, the enabled filter action enhances the noise subtraction and dynamically compensates for changes in, for example, wavelength, polarization state or drift in the electronics.

In accordance with the invention, typically a first Kalman filter, such as Kalman filter 250 estimates the FIR filter coefficients for FIR filter 255 for imbalances that are typically due to the coupler/combiner, preamplifiers and photodiodes. A second Kalman filter, such as single coefficient Kalman filter 770 is used to dynamically estimate the FIR filter coefficient for single coefficient FIR filter 780 for drifts typically due to wavelength and polarization state changes. This is shown in the simplified block diagram of FIG. 9 where 950 represents the first Kalman filter block and 970 represents the second Kalman filter block.

Figure 8A:
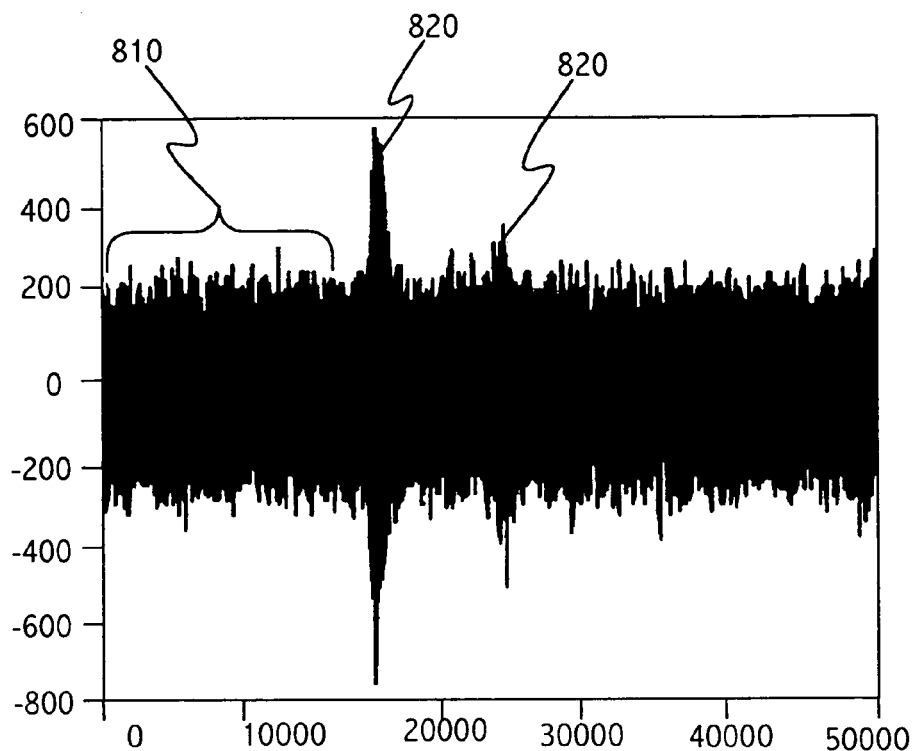
FIGS. 8a–b show the improvement in heterodyne signal using an embodiment in accordance with the invention.
Figure 8B:
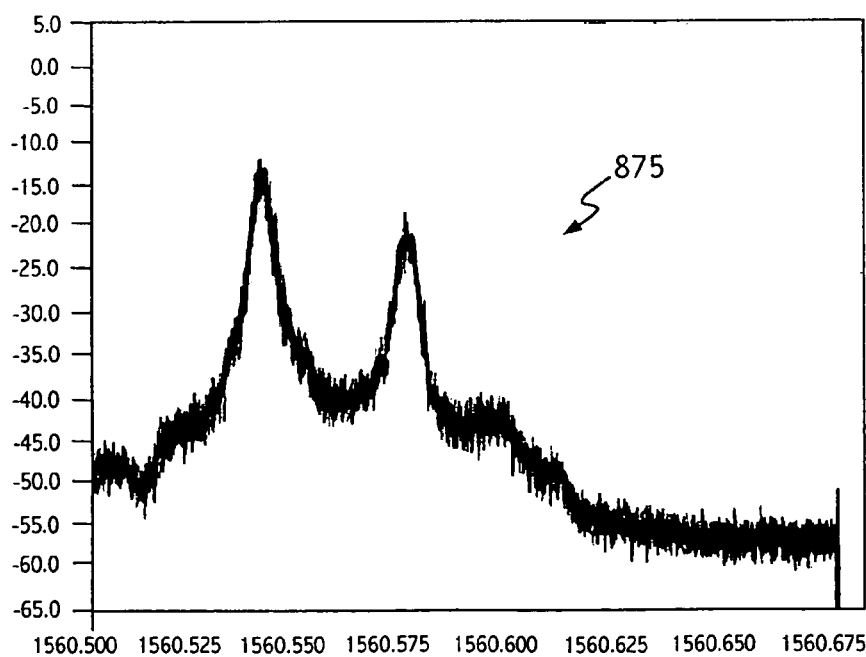

FIG. 8a shows a very noisy signal in a balanced receiver configuration in accordance with an embodiment of the invention. When $$g_o^{(k)}$$

is close to 1, the measurement system is dominated by intensity noise 810. Heterodyne beat signal 820 is largely buried by the intensity noise. FIG. 8b shows the effect of the continuous application of dynamic Kalman filter 770 and the optimized spectral measurement of the signal in FIG. 8a to produce recovered spectrum 875.

Whereas the concept of dynamic subtraction has been discussed in the context of a single coefficient Kalman filter which is sufficient to correct for most wavelength and polarization related amplitude changes, analogous implementations in accordance with the invention are possible for more complex FIR filters which provide higher order corrections that account for non-uniform change of amplitude or phase over the electrical bandwidth of the receiver. The identification of the intensity noise region can be connected with one of the filter coefficients, for example, $g_0 \approx 1$ in a configuration correcting one of the output channels or $a_0 \approx 1$ in a configuration correcting both output channels.

Figure 9:
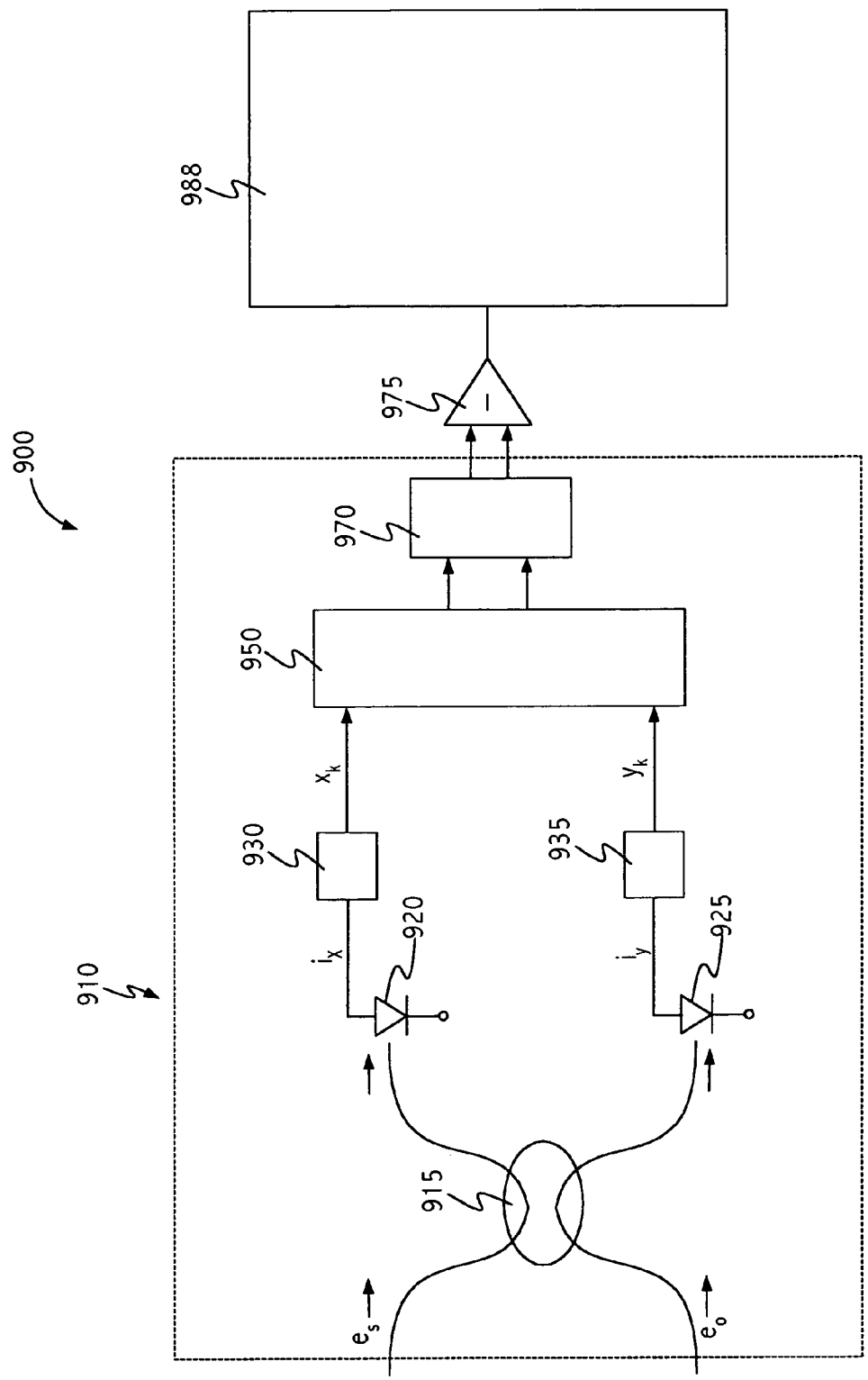
FIG. 9 shows an embodiment of a balanced receiver in accordance with the invention.

FIG. 9 shows a simplified block diagram of optical heterodyne receiver system 900. Optical input $e_s$ and optical input (local oscillator signal) $e_o$ enter balanced receiver 910 where static Kalman filter block 950 functions to calibrate and correct for the imbalances in coupler/combiner 915, photodiodes 920 and 925 and preamplifiers 930 and 935. Kalman filter block 950 includes both the static Kalman filter, such as static Kalman filter 250 and the FIR filter, such as FIR filter 255. Calibration is accomplished without the local oscillator signal being present using the static Kalman filter only. Dynamic Kalman filter block 970 allows for the adjustment of signal subtraction when characteristics of the input optical signal such as wavelength or polarization change. Dynamic Kalman filter block 970 includes both the dynamic Kalman filter, such as dynamic Kalman filter 550 and the single coefficient FIR filter 560, such as FIR filter. Note that Kalman filter block 950 and Kalman filter block 970 may be implemented in hardware or in software using a processor. Intensity noise subtraction is typically performed in hardware or software by subtraction operation 975 prior to the heterodyne beat signal entering, for example, signal processing unit 988.

Figure 10:
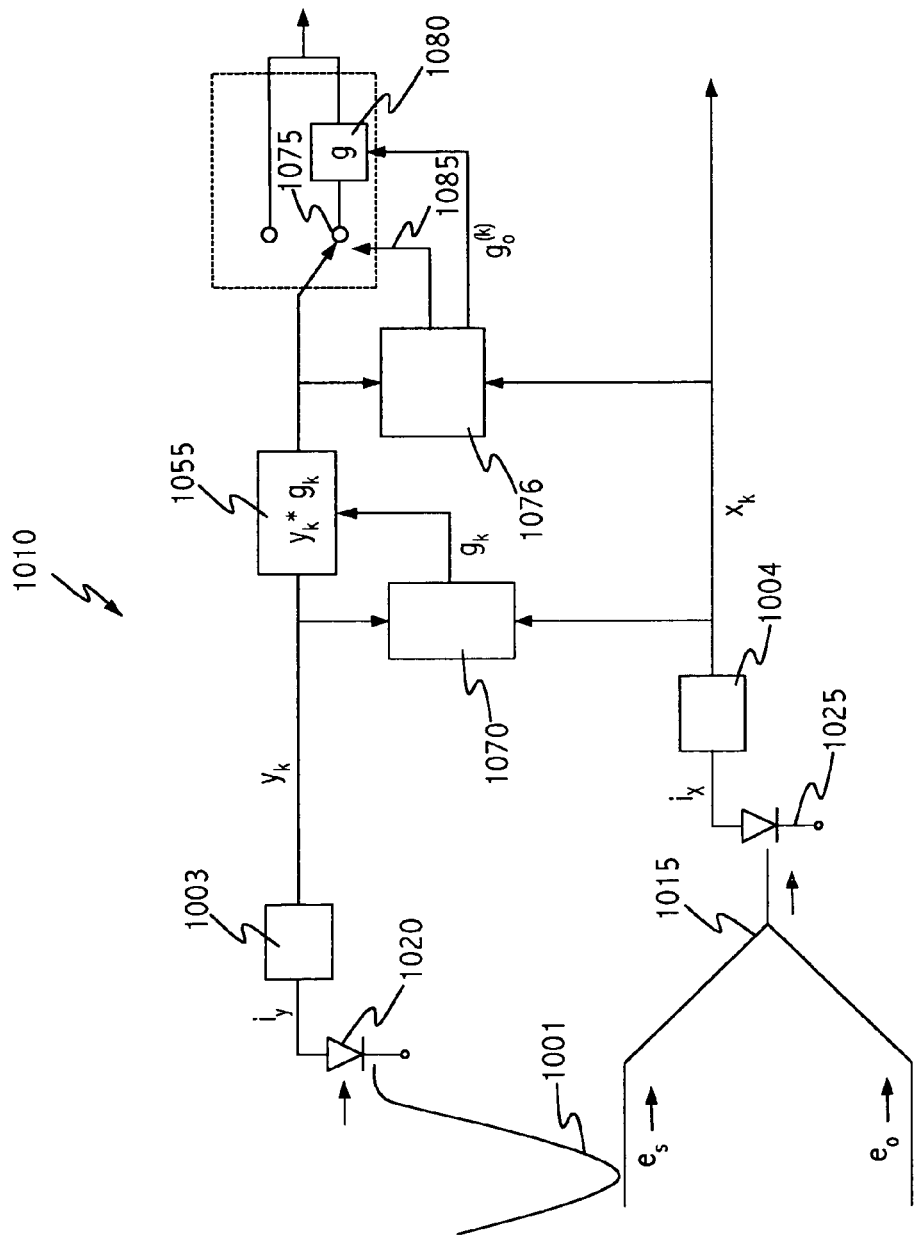
FIG. 10 shows an embodiment of a single receiver in accordance with the invention.

FIG. 10 shows another exemplary embodiment in accordance with the invention. The embodiment shown in FIG. 10 allows the subtraction of intensity noise for single receiver configuration 1010. FIG. 10 shows a single output heterodyne receiver configuration where the optical input which contains intensity noise from the laser (not shown) is monitored by photodiode 1020 at tap 1001 and converted to an electrical output before passing through preamplifier 1003. Typically, tap 1001 routes a fraction of the optical input to photodiode 1020. The remaining portion of the optical input es from the laser (not shown) enters y-combiner 1015 which results in being detected by photodiode 1025 and converted to an electrical output before passing through preamplifier 1004. To optimize the subtraction of the intensity noise, intensity noise contained in the electrical outputs x(t) and y(t) in the respective channels needs to be calibrated and equalized because of imbalances due to the tap efficiency, the different responsivities of photodiodes 1020 and 1025 and preamplifiers 1003 and 1004. Note that the optical input $e_o$ from the local oscillator is not present during this calibration. Equalization may be achieved by filtering the sampled intensity noise $y_k$ in FIR filter 1055. FIR filter coefficients $g_k$ are determined according to process Eqs. (2) and (3) above. The appropriate FIR filter coefficients $g_k$ are estimated using static Kalman filter 1070 which may be hardware or software implemented along with FIR filter 1055. For example, if static Kalman filter 1070 is implemented in software, Kalman filter 1070 comprises computer-readable instructions stored in memory or other computer readable medium and a processor to implement the recursive Kalman filter.

After the two channels have been calibrated and equalized by use of static Kalman filter 1070, single coefficient Kalman filter 1076 estimates the FIR filter coefficient for adjustment of subtraction when characteristics of the optical signal change in time. Heterodyne signal and intensity noise contained in both $x_k$ and $g_k^* y_k$, are sampled by dynamic Kalman filter 1076 which optimizes FIR filter coefficient $$g_o^{(k)}$$

for single coefficient FIR filter 1080. A single coefficient FIR filter only allows adjustment of amplitude but has the benefit of having little computational overhead. Static Kalman filter 1076 and single coefficient FIR filter 1080 may be implemented in hardware or software. For example, if Kalman filter 1076 is implemented in software, Kalman filter 1076 comprises computer-readable instructions stored in memory or other computer readable medium and typically a processor to implement the recursive Kalman filter as described below. The process equations required by single coefficient Kalman filter 1076 are Eqs. (1) and (2) above.

Single coefficient dynamic Kalman filter 1076 continuously estimates FIR filter coefficient $$g_o^{(k)}$$

and differentiates between spectral regions dominated by noise and spectral regions dominated by the heterodyne beat signal. FIR filter 1080 is only applied when the channel is intensity noise dominated. Noise flag 1085 serves to set switch 1075 to pass $y_k^* g_k$ through FIR filter 1080 when $$g_o^{(k)}$$

is approaching 1 within some tolerance, for example, ±0.2. Otherwise $y_k^* g_k$ is not modified. In regions where the heterodyne beat signal is dominated by noise, enabled FIR filter 1080 enhances the noise subtraction and dynamically compensates for changes in, for example, wavelength, polarization state or drift in the electronics.

Figure 11:
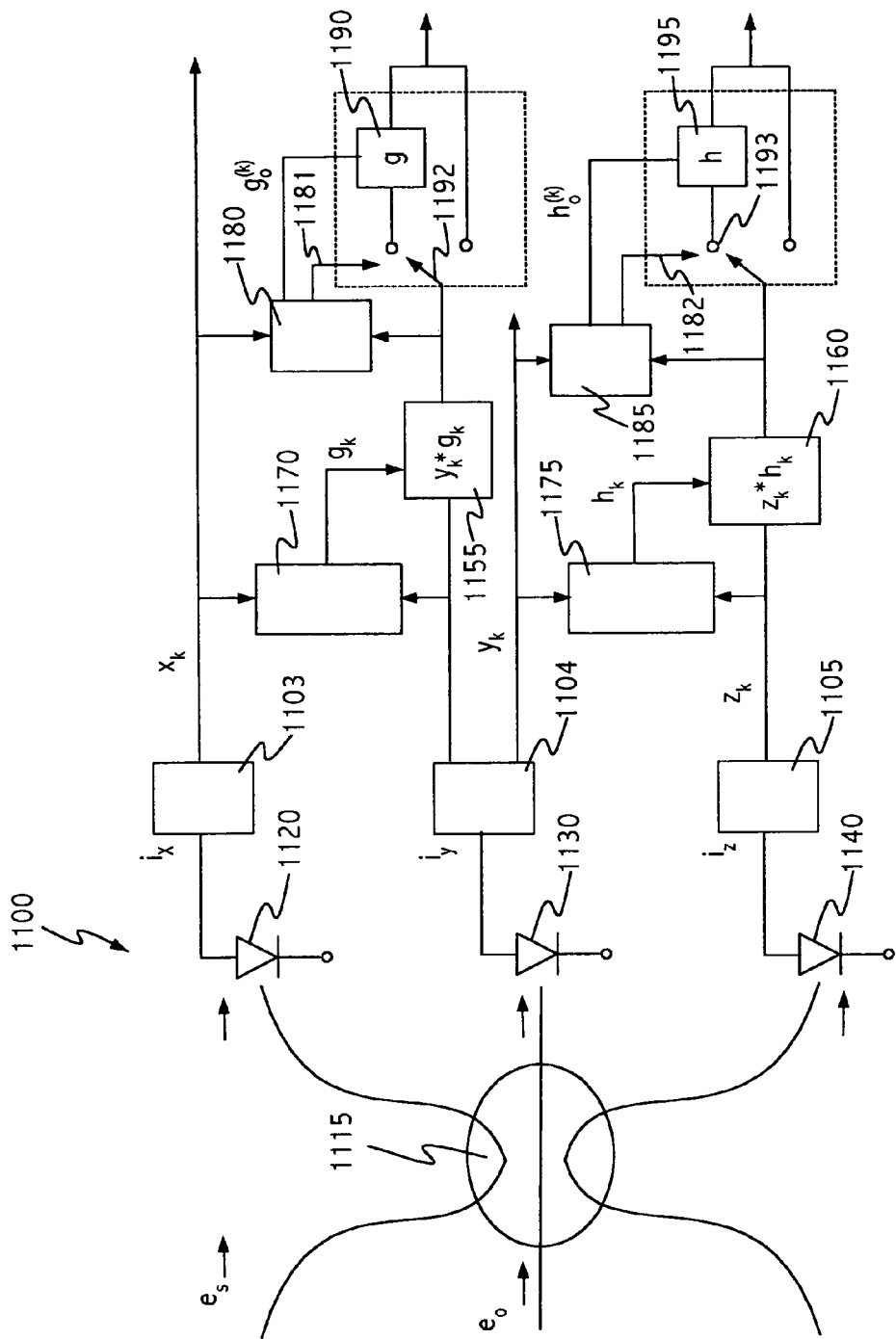
FIG. 11 shows an embodiment in accordance with the invention.

FIG. 11 shows a configuration where all three signals contain both the heterodyne signal and intensity noise when optical heterodyne receiver 1100 is in operation. The heterodyne signal is separated in phase by 120 degrees at each photodiode. The intensity noise is in phase at each photodiode 1120, 1130 and 1140. Optical input $e_s$ from the laser and optical input $e_o$ from the local oscillator enter 3×3 coupler/combiner 1115. The heterodyne signal and intensity noise are detected by photodiodes 1120, 1130 and 1140 and then converted to electrical outputs and passed through preamplifiers 1103, 1104 and 1105, respectively. For calibration of optical heterdyne receiver 1100 only optical input $e_s$ is used. This results in only intensity noise being received at photodetectors 1120, 1130 and 1140 during the receiver calibration process. To optimize the subtraction for canceling the intensity noise, intensity noise contained in the electrical outputs x(t) and y(t) and y(t) and z(t) in the respective channels needs to be made equal. To make y(t) substantially equal to x(t), the sampled intensity noise $y_k$ is filtered in FIR filter 1155 and to make z(t) substantially equal to y(t), the sampled intensity noise $z_k$ is filtered in FIR filter 1160. The appropriate filter coefficients $g_k$ and $h_k$ are estimated using Kalman filters 1170 and 1175 which along with FIR filters 1155 and 1160 may be hardware or software implemented. For example, if Kalman filters 1170 and 1175 are implemented in software, Kalman filters 1170 and 1175 comprise computer-readable instructions stored in memory or other computer readable medium and a processor to implement the recursive Kalman filters 1170 and 1175.

During the operation of optical heterodyne receiver 1100 electrical outputs $x_k$, $y_k$ and $z_k$ contain both intensity noise and a heterodyne signal and dynamic Kalman filters 1180 and 1185 continuously estimate FIR filter coefficients $$g_o^{(k)} \text{ and } h_o^{(k)}$$

to differentiate between spectral regions dominated by noise and spectral regions dominated by the heterodyne beat signal. A correction is only applied when the channels are intensity noise dominated. Noise flags 1181 and 1182 serve to set switches 1192 and 1193 to pass $y_k^*g_k$ and $z_k^*h_k$ through blocks 1190 and 1195 for filtering by FIR filter 1190 and FIR filter 1195 when $$g_o^{(k)} \text{ and/or } h_o^{(k)}$$

is approaching 1 within some tolerance, for example, ±0.2. Otherwise $y_k^*g_k$ and $z_k^*h_k$ are not modified. In regions where the heterodyne beat signal is dominated by noise, the enabled filter action enhances the noise subtraction and dynamically compensates for changes in, for example, wavelength, polarization state or drift in the electronics.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. An optical heterodyne receiver system comprising:
a balanced optical receiver for receiving a first and second optical input, said balanced optical receiver outputting a first and second electrical output in response to said first and second optical input, respectively; and
a first FIR filter electrically coupled to said balanced optical receiver, said first FIR filter enabled to output a filtered first electrical output substantially equal to said second electrical output.

2. The optical heterodyne receiver system of claim 1 wherein said first and said second electrical output each comprise intensity noise.

3. The optical heterodyne receiver system of claim 2 wherein a Kalman filter is used to estimate coefficient values of said first FIR filter based on said intensity noise.

4. The optical heterodyne receiver system of claim 1 wherein said filtered first electrical output and said second electrical output each comprise said intensity noise and a heterodyne signal.

5. The optical heterodyne receiver system of claim 4 wherein a second FIR filter is enabled to be selectively couped to said first FIR filter to receive said filtered first electrical output.

6. The optical heterodyne receiver system of claim 5 wherein a dynamic Kalinan filter is enabled to estimate a single coefficient value of said second FIR filter based on said intensity noise and said heterodyne signal.

7. The optical heterodyne receiver system of claim 6 wherein said single coefficient value is used to determine when said second FIR filter is coupled to said first FIR filter.

8. The optical heterodyne receiver system of claim 1 wherein said first FIR filter is a dynamic FIR filter enabled to be selectively coupled to said balanced receiver.

9. The optical beterodyne receiver system of claim 4 further comprising a subtraction unit for differencing said filtered first electrical output and said second electrical output to cancel said intensity noise.

10. The optical heterodyne reciver system of claim 9 further comprising a signal processing unit coupled to said subtraction unit.

11. The optical heterodyne receiver system of claim 10 wherein said signal processing unit comprises an optical spectrum analyzer.

12. An optical heterodyne receiver system comprising:
an optical combiner enabled to receive a first portion of an optical input;
a first optical receiver coupled to said optical combiner, said first optical receiver enabled to output a first electrical output in response to said first portion of said optical input;
a second optical receiver enabled to receive a second portion of said first optical input, said second optical receiver enabled to output a second electrical output in response to said second portion of said first optical input; and
a first FIR filter coupled to said second optical receiver, said first FIR filter enabled to output a filtered second electrical output substantially equal to said first electrical output.

13. The optical heterodyne receiver system of claim 12 wherein said first FIR filter is a dynamic FIR filter enabled to be selectively coupled to said balanced receiver.

14. The optical heterodyne receiver system of claim 12 wherein said first optical input comprises intensity noise.

15. The optical heterodyne receiver system of claim 14 wherein a Kalman filter is used to estimate coefficient values of said first FIR filter based on said first and second electrical output.

16. The optical heterodyne receiver system of claim 14 wherein said optical combiner is further enabled to receive a second optical input such that said second electrical output comprises intensity noise and a heterodyne signal.

17. The optical heterodyne receiver system of claim 16 wherein a second FIR filter is enabled to be selectively coupled to said first FIR filter to receive said filtered first electrical output.

18. The optical heterodyne receiver system of claim 17 wherein a dynamic Kalman filter is enabled to estimate a single coefficient value of said second FIR filter based on said intensity noise and said heterodyne signal.

19. The optical heterodyne receiver system of claim 18 wherein said single coefficient value is used to determine when said second FIR filter is coupled to said first FIR filter.

20. The optical heterodyne receiver system of claim 16 further comprising a subtraction unit for differencing said filtered second electrical output and said first electrical output to cancel said intensity noise.

21. The optical heterodyne receiver system of claim 20 further comprising a signal processing unit.

22. The optical heterodyne receiver system of claim 21 wherein said signal processing unit comprises an optical spectrum analyzer.

23. An optical heterodyne receiver system comprising: an optical combiner enabled to receive a first optical input a first optical receiver coupled to said optical combiner, said first optical receiver enabled to output a first electrical output in response to a first portion of said first optical input;
- a second optical receiver coupled to said optical combiner, said optical receiver enabled to output a second electrical output in response to a second portion of said first optical input;
- a third optical receiver coupled to said optical combiner, said optical receiver enabled to output a third electrical output in response to a third portion of said first optical input;
- a first FIR filter coupled to said second optical receiver, said first FIR filter enabled to output a filtered second electrical output substantially equal to said first electrical output; and
- a second FIR filter coupled to said third optical receiver, said second FIR enabled to output a filtered third electrical output substantially equal to said second electrical output.

24. The optical heterodyne receiver system of claim 23 wherein said first optical input comprises intensity noise.

25. The optical heterodyne receiver system of claim 23 wherein a first Kalman filter is used to estimate coefficient values of said first FIR filter based on said first and second electrical outputs and a second Kalman filter is used to estimate coefficient values of said second FIR filter based on said second and said third electrical outputs.

26. The optical heterodyne receiver system of claim 25 wherein said optical combiner is further enabled to receive a second optical input such that said first electrical output comprises a first intensity noise and a first heterodyne signal, said second electrical output comprises a second intensity noise and a second heterodyne signal and said third electrical output comprises a third intensity noise and a third heterodyne signal.

27. The optical heterodyne receiver system of claim 26 wherein a third FIR filter is enabled to be selectively coupled to said first FIR filter to receive said filtered second electrical output.

28. The optical heterodyne receiver system of claim 27 wherein a dynamic Kalman filter is enabled to estimate a single coefficient value of said third FIR filter based on said intensity noise and said heterodyne signal.

29. The optical heterodyne receiver system of claim 27 wherein said single coefficient value is used to determine when said third FIR filter is coupled to said first FIR filter.

\* \* \* \* \*

UNITED STATES PATENT AND TRADEMARK OFFICE
CERTIFICATE OF CORRECTION

| | | |
|---|---|---|
| PATENT NO. | : 7,162,165 B2 | Page 1 of 1 |
| APPLICATION NO. | : 10/212495 | |
| DATED | : January 9, 2007 | |
| INVENTOR(S) | : Szafraniec | |

It is certified that error appears in the above-identified patent and that said Letters Patent is hereby corrected as shown below:

On the Title Page in "Title", in Item 54, line 1, after "FILTER" delete "ASSEMBLY".

On the Title Page, under "U.S. Patent Documents", Item 56, line 2, delete "Hamimi" and insert -- Hakimi --, therefor.

In column 1, in "Title", line 1, after "FILTER" delete "ASSEMBLY".

In column 10, line 17, in Claim 5, delete "couped" and insert -- coupled --, therefor.

In column 10, line 20, in Claim 6, delete "Kalinan" and insert -- Kalman --, therefor.

In column 10, line 29, in Claim 9, delete "beterodyne" and insert -- heterodyne --, therefor.

In column 10, line 33, in Claim 10, delete "reciver" and insert -- receiver --, therefor.

Signed and Sealed this

Twenty-seventh Day of May, 2008

JON W. DUDAS
*Director of the United States Patent and Trademark Office*